United States Patent
Karanovic et al.

(10) Patent No.: US 6,347,154 B1
(45) Date of Patent: Feb. 12, 2002

(54) CONFIGURABLE HORIZONTAL SCALER FOR VIDEO DECODING AND METHOD THEREFORE

(75) Inventors: Marinko Karanovic, Don Mills; James B. Fry, Newmarket, both of (CA)

(73) Assignee: ATI International SRL (BB)

( * ) Notice: Subject to any disclaimer, the term of this patent is extended or adjusted under 35 U.S.C. 154(b) by 0 days.

(21) Appl. No.: 09/288,433

(22) Filed: Apr. 8, 1999

(51) Int. Cl.$^7$ .............................. G06K 9/36; G06K 9/46
(52) U.S. Cl. ................... 382/233; 382/298; 375/240.25
(58) Field of Search ................................. 382/233, 232, 382/260, 298, 305; 375/240.21, 240.25

(56) References Cited

U.S. PATENT DOCUMENTS

| 5,754,162 A | * | 5/1998 | Cahill, III | 382/299 |
| 5,790,714 A | * | 8/1998 | McNeil et al. | 382/300 |
| 6,205,251 B1 | * | 3/2001 | Hsieh et al. | 382/233 |

* cited by examiner

*Primary Examiner*—Bhavesh Mehta
(74) *Attorney, Agent, or Firm*—Vedder, Price, Kaufman & Kammholz

(57) ABSTRACT

A method and apparatus for performing scaling functions on a video signal is presented, where the scaling functions include a change in data rate of the signal. This is accomplished by performing the data rate conversion within a horizontal scaler of a video decoder. Filtering operations in the horizontal scaler are adjusted in order to take advantage of the data rate differential. Qualifier signals accompany portions of the video signal to indicate whether or not a particular portion of the signal is valid. These qualifiers are interpreted within the circuit to identify the portions that should be dropped, and the portions to be included in the output signal. In addition, registers within the horizontal scaler are used to store data corresponding to blanking regions within the input video signal, where data included in these blanking regions must be passed to the output signal in its entirety. The qualifiers corresponding to this portion of the data stream are all set to the valid level, indicating that none of the blanking region data is to be discarded.

21 Claims, 6 Drawing Sheets

CONFIGURABLE HORIZONTAL SCALER FOR VIDEO DECODING AND METHOD THEREFORE

FIELD OF THE INVENTION

The invention relates generally to video signal processing and more particularly to a horizontal scaler for video decoding and method therefore.

BACKGROUND OF THE INVENTION

Video signals originate from a variety of sources including TV tuners, digital video disc (DVD) players, video cassette recorders (VCRs), video cameras, etc. In many cases, the format of the video signal is improper for the display or processor to which the signal is routed. As such, horizontal and vertical scaling operations are performed on the video signal in order to adapt the video signal to the proper output configuration. In many cases, this adaptation or scaling of the video signal includes altering the data rate of the input video signal to match the desired clock rate of the output signal.

In many cases, scaling and aligning the data for display involves reducing the effective data rate of the signal. The lower data rate produced through scaling can force system designers to include large buffers to hold portions of data that arrive at a higher clock rate before they are able to be transmitted as an output signal at a lower clock rate. Depending on the level of scaling performed by the circuit, the size of these output buffers can be substantial. Large output buffers increase the die area of integrated circuits that perform these video decoding function, thus adding to overall system cost.

Therefore, a need exists for method and apparatus for scaling video signals while minimizing the amount of buffering required to accommodate the changes in data rate that occur between the received input video signal and the scaled output video signal.

DETAILED DESCRIPTION OF A PREFERRED EMBODIMENT OF THE INVENTION

Generally, the present invention provides a method and apparatus for performing scaling functions on a video signal, where the scaling functions include a change in data rate of the signal that requires a minimal amount of buffering memory. This is accomplished by performing the data rate conversion within the horizontal scaler of the video decoder. Filtering operations in the horizontal scaler are adjusted in order to take advantage of the data rate differential. Qualifying signals accompany portions of the video signal to indicate whether or not a particular portion of the signal is a valid portion. These qualifiers are interpreted within the circuit to identify which portions should be dropped, and which should be included in the output signal. By altering the data rate within the horizontal scaler, data does not need to be buffered as it is included in the output video signal as provided by the scaler. Buffering resources are further reduced by utilizing registers within the horizontal scaler to store data corresponding to blanking regions within the input video signal, where data included in these blanking regions must be passed to the output signal in its entirety. The qualifiers corresponding to this portion of the data stream are all set to the valid level, indicating that none of the blanking region data is to be discarded.

Figure 1:
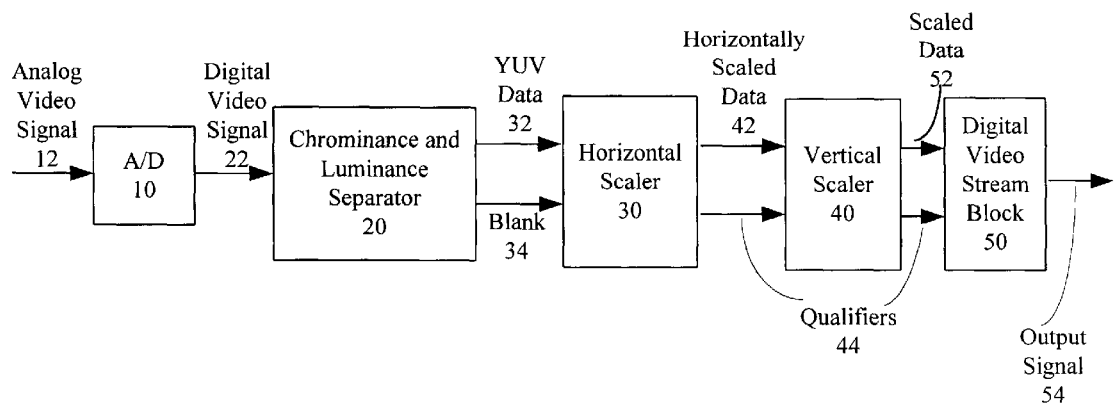
FIG. 1 illustrates a block diagram of a video decoder in accordance with the present invention.

The invention can be better understood with reference to FIGS. 1–7. FIG. 1 illustrates a video decoder that includes an analog to digital converter (A/D) 10, a separation block 20, a horizontal scaler 30, a vertical scaler 40, and a digital video stream block 50. The A/D 10 receives an analog video signal 12 and digitizes it to produce a digital video signal 22. The analog video signal may be generated by a variety of potential sources including a TV tuner, a VCR, a video camera, etc. The digital video signal 22 is composed of a number of portions of data that are received at a first rate. The first rate corresponds to the clock rate that corresponds to the digital video information. Note that if the source of the video signal generates a digital video signal 22 rather than an analog signal, the A/D 10 can be bypassed or eliminated from the circuit.

Preferably, the digital video signal 22 is separated by the separation block 20 to produce separated video data 32 and a blanking signal 34. More preferably, the separation block is a chrominance and luminance separator 20 that presents the separated video data in a YUV format. The YUV data 32 is at the first rate that is preferably greater than the desired data rate of the output signal 54 produced by the video decoder. As such, the digital video signal 22 must be scaled in order to convert the video information to the proper data rate. Preferably, the separation block 20 includes a comb filter.

The scaling operations performed by the video decoder may include both horizontal and vertical scaling. Horizontal scaling scales the video information along the horizontal axis, whereas vertical scaling scales the video information along a vertical axis. Preferably, the horizontal scaling occurs prior to the vertical scaling. However, in other embodiments, the vertical scaling may be performed prior to the horizontal scaling, or the vertical scaling may be eliminated completely.

The horizontal scaler 30 is operably coupled to the separation block 20 and receives the YUV data 32 and the blanking signal 34. The horizontal scaler 30 scales the separated video data based on a scaling ratio and the blanking signal to produced horizontally scaled data 42 at a second rate. Preferably, the second rate corresponds to the desired rate of the output signal 54. Because the second rate is slower than the first rate, the horizontal scaler 30 has additional clock cycles to manipulate, or filter, the data. The number of additional clock cycles is based on the differential between the input signal data rate and the output signal data rate. As such, depending on the scaling ratio, which is preferably stored in a register, the horizontal scaler 30 can expand the filtering operations performed within the scaler 30 to both improve the resulting output signal and to perform the data rate conversion. In order to take advantage of the data rate differential, the horizontal scaler 30 includes configurable filter blocks, which are further described below with reference to FIG. 2.

The horizontal scaler 30 preferably runs at the first clock rate, which corresponds to the input YUV data stream 32. The effective output data rate of the horizontal scaler 30, however, should match the desired output signal data rate. In order to achieve this, the horizontal scaler 30 produces an output data stream at the first rate that includes a number of sets of data that are invalid. The occurrence of valid data in the output data stream of the horizontal scaler 30 corresponds to the desired output rate. This will be discussed in more detail with respect to FIGS. 4 and 5 below. In order to determine whether or not a particular portion of data included in the horizontally scaled data stream 42 is valid, a qualifier is passed along with each portion of data in the scaled data stream. The qualifiers 44 that are passed along with data in the data stream identify valid portions of data, and allow invalid portions of data to be overlooked or discarded.

The horizontally scaled data 42 is preferably passed to the vertical scaler 40 along with the qualifying information 44. The vertical scaler 40 preferably performs vertical scaling operations on the horizontally scaled data 42 to produce scaled data 52 which is then provided to the digital video stream block 50. Once again, qualifiers accompany the data stream passed to the digital video stream block 50, thus allowing the digital video stream block 50 to distinguish valid data from invalid data. The digital video stream block 50 generates a digital video stream output signal 54 at the second rate based on the received scaled data 52 and its accompany qualifiers 44.

When a video signal is provided to a display such as a television, there are blanking regions associated with the time the display takes to reset the scanning mechanism from one portion of the display to another. These blanking regions include horizontal blanking regions and vertical blanking regions. The vertical blanking regions are associated with moving from the bottom of the display to the top of the display, and horizontal blanking regions are associated with moving from one side of the display to the other at the end of each line. Typically, the ratio of drawing time to blanking region time is 3:1 such that 25 percent of the time a display is operating in a blanking region. No drawing information is required by the display during the blanking region.

In many cases, this blanking region is utilized by sources of video signals to include audio information, closed captioning information, or other information that can be included in the blanking portion of the video signal without interfering with the drawing operations. Because this portion of the digital video signal is not image data, the scaling operations performed by the horizontal and vertical scalers are not appropriate for manipulation of this data. The data included in the blanking regions should instead be passed directly through the video decoding block where the only alteration that occurs to this data is the change in data rate based on the data rate differential between the output signal 54 and the digital video signal 22.

In prior art systems, the blanking region data received at the first data rate had to be placed in one or more buffers before being provided as an output at the second data rate which is typically much slower. As such, the buffers included in such systems could be very large, as the buffers were scaled to deal with the worst case data rate differential that could exist in an application. The additional memory requirement for buffering this data is undesirable as it increases die area and complexity, thus increasing overall circuit cost.

The present invention alleviates the need for these large buffers by utilizing registers included in the horizontal scaler 30 for storage of the data in the blanking regions. Thus, by manipulating the data pipeline included in the horizontal scaler 30, the pipeline can be made to work as a first in first out (FIFO) buffer. This buffering is discussed in more detail with respect to FIGS. 2, 3, and 5 below. In order for the blanking region data to be passed by the vertical scaler 40 and included in the output signal 54, the qualifiers associated with the data portions that comprise the blanking region data are all set to the valid state.

Figure 2:
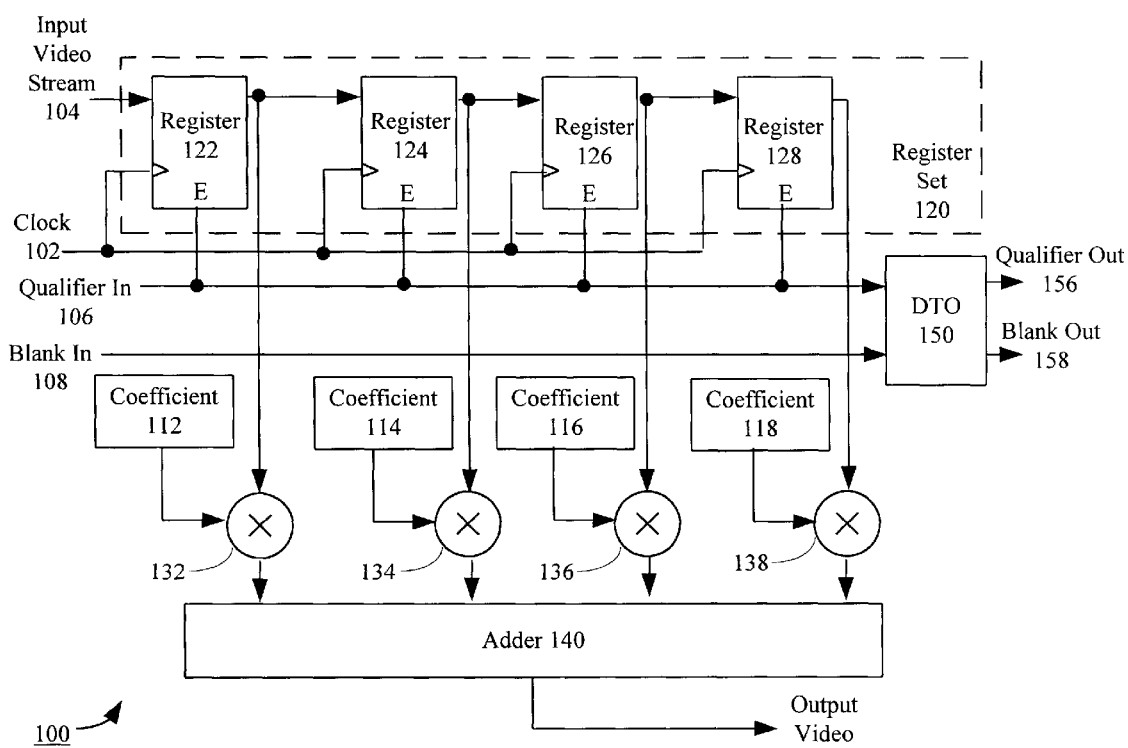
FIG. 2 illustrates a block diagram of a filter block in accordance with the present invention.
Figure 3:
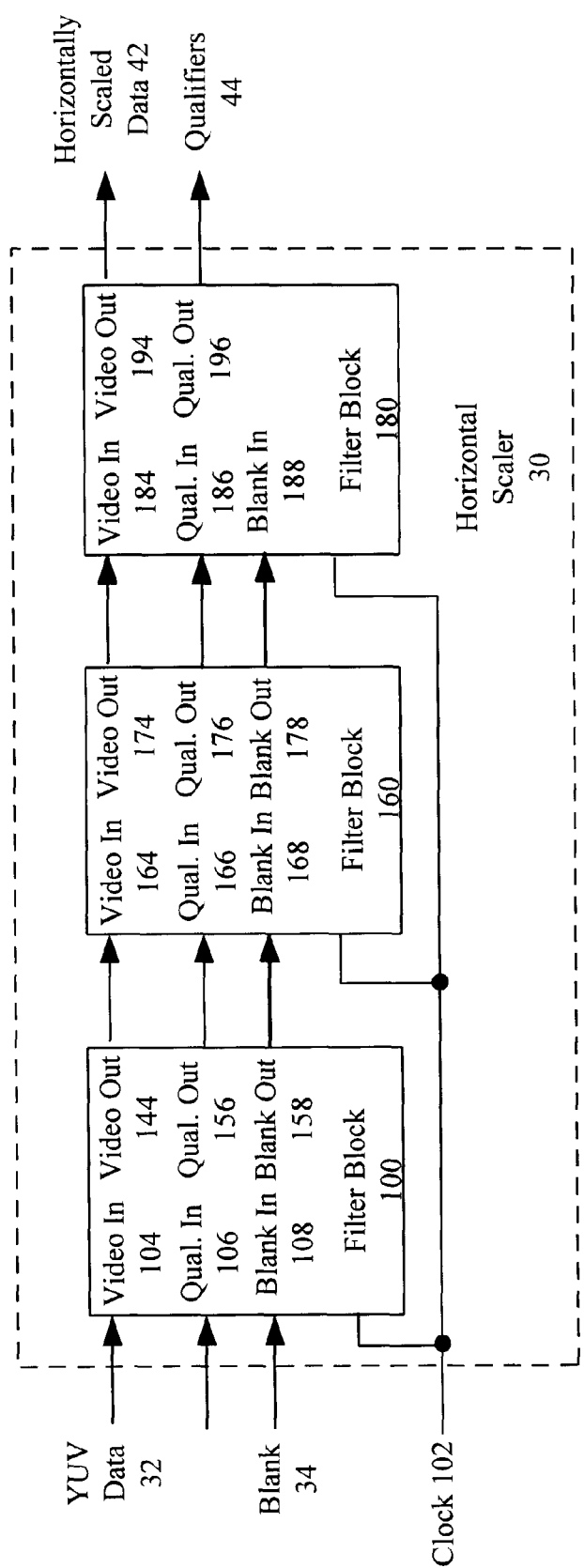
FIG. 3 illustrates a block diagram of a horizontal scaler in accordance with the present invention.

FIG. 2 illustrates a filter block 100 that is included in the horizontal filter 30 of FIG. 1. As is shown in FIG. 3, a number of the filter blocks are used to create the horizontal scaler 30. Note that although three filter blocks are illustrated in FIG. 3, the number of filter blocks may be greater or smaller based on the particular application. Each filter block 100 includes a register set 120, a discrete time oscillator (DTO) 150, a plurality of coefficient registers 112–118, a plurality of multipliers 132–138, and an adder 140. The register set 120 receives the input video stream 104, a clock signal 102, and a qualifier input 106. The qualifier input 106 is coupled to the enable input of each of the registers 122–128 in the register set 120. When the qualifier input is in the valid state, the registers 122–128 will act as a shift register, passing data from left to right.

The contents of each of the registers 122–128 are passed to the multipliers 132–138, which multiply the input data stored in the registers 122–128 with the coefficients stored in the coefficient registers 112–118. Note that the multiplication may be performed by a smaller number of multipliers that utilize the extra clock cycles provided by the data rate differential to spread out the computations required for filtering. The products of these multiplications are combined in the adder 140 to produce data elements of the output video stream 144. As can be seen, when the qualifier in signal 106 is in the invalid state, the multiplication operations will also be invalid, and as such, the data included for that clock cycle in the output video stream 144 will invalid. As such, the qualifier out signal 156 produced by the DTO will indicate to the downstream filter or other block that the data corresponding to that particular clock cycle is invalid. The DTO generates the output qualifiers based on the received qualifiers and the scaling ratio of the filtering block within which it is operating.

The scaling operations performed by the filter block 100 are well known in the art in that coefficients are multiplied by input data elements and the results are combined to produce an output data element. Each output data element will include contributions from at least one of the input data elements in the registers set 120, and the configurability provided by the coefficient registers allows the contributions of each input data element to be fully controlled. By setting a coefficient to zero, the contribution of a particular input data element can be removed from the output data element produced.

The blank input 108 is provided to the DTO 150 to determine when blanking data is to be passed through the filter block 100. When blanking data is passed, each piece of input data received is valid, and therefore is received with a valid qualifier and is provided with a corresponding valid qualifier when it is included in the output video stream 144. The blanking data may utilize the register set 120 as a FIFO buffer by configuring the coefficients in the coefficient registers to pass the data in the register 128 to the adder with a coefficient of 1. The coefficients corresponding to the other registers 122–126 are then set to zero, such that the value of the register 128 is transferred out as the next element in the output video stream 144. In other embodiments, the output of the register 128 may be provided to a downstream multiplexer that can select between the output video stream 144 and the output of the register 128 based on the blank output signal 158 or some other control mechanism that indicates that blanking region data is being buffered.

The DTO generates the blank output 158 based on the blank input signal 108 and the number of registers of the registers set 120 to be included in the FIFO. Note that the number of registers, coefficients, and multipliers in a filtering block is arbitrary and can be optimized to suit a particular application.

FIG. 3 illustrates a number of filter blocks 100, 160, and 180 combined to produce a horizontal scaler 30. The first filter block 100 receives the YUV data 32, the blank signal 34, and the clock input 102. Preferably, the qualifier input 106 of the first filter block is set to a valid state such that all incoming data to the first filter block 100 is presumed valid. Each of the filter blocks 100, 160 and 180 preferably performs some portion of the overall scaling operation to produce the horizontally scaled data 42 and its accompanying qualifiers 44.

Figure 4:
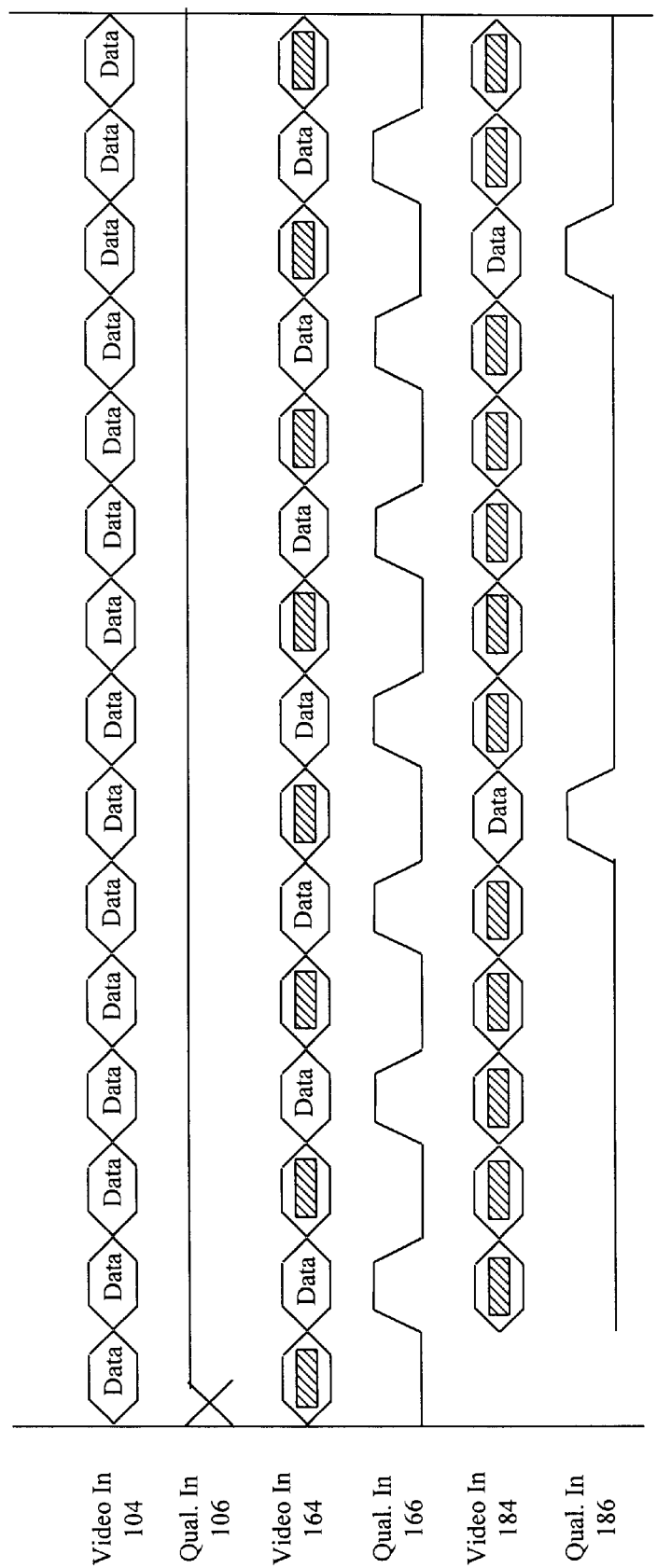
FIG. 4 illustrates a timing diagram corresponding to the operation of the horizontal scaler of FIG. 3 in accordance with the present invention.
Figure 5:
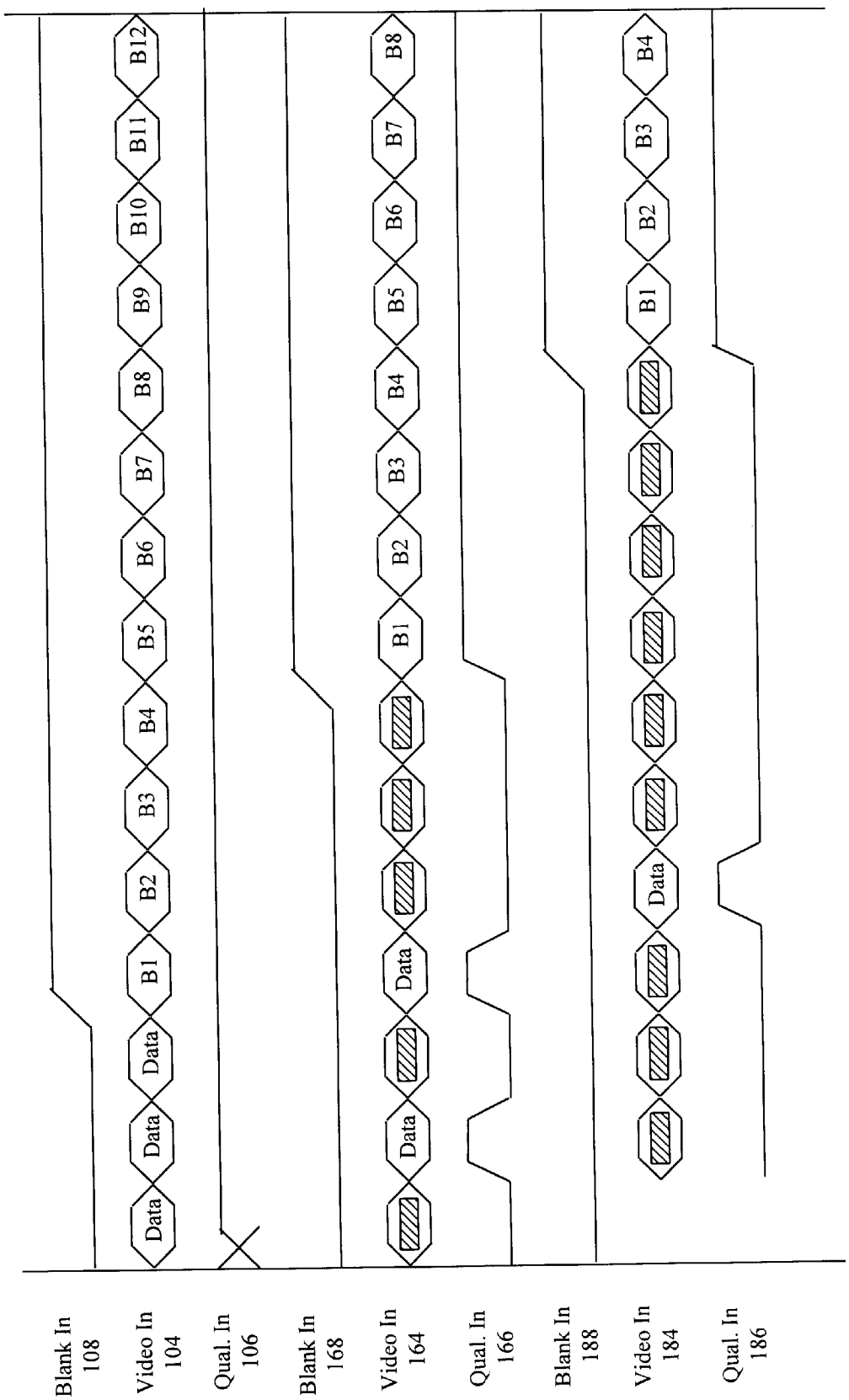
FIG. 5 illustrates another timing diagram corresponding to the operation of the horizontal scaler of FIG. 3 in accordance with the present invention.

FIGS. 4 and 5 provide timing diagrams that help illustrate the functionality of the horizontal scaler 30 of FIG. 3. In FIG. 4, the first filter block 100 receives the video input signal 104, which is preferably the YUV data 32 of FIG. 1. The data in this data stream is valid on each clock cycle, and the qualifier input 106 provided to the filter block 100 indicates that all of the input data is valid. For illustration purposes, a logical high on the qualifier signal represents valid data.

In the example illustrated, the first filter block 100 scales the data using a 2:1 ratio such that for every two input data sets, or pixels, received, a single valid output data set is produced. As such, the video output 144, which is coupled to and illustrated in FIG. 4 as video input 164, includes valid data on every other cycle. The shaded blocks in the timing diagram indicate invalid data. Note that the qualifier produced by the first filter block 100 and provided to the qualifier input 166 of the second filter block 160 indicates that valid data is present on every other cycle. As such, the register set of the second filter block 160 will only capture the valid portions of the data stream, allowing invalid portions to be discarded.

Continuing with the example, the second filter block 160 scales the data using a 3:1 ratio such that for every three valid data sets received, a single valid data set is produced. Note that the combination of the first and second filter blocks produces a data stream where every sixth data set is valid. The third filter block can then be utilized to further scale the signal to produce the desired output rate. The qualifiers that are provided with the data stream allow downstream entities to discard or ignore invalid data portions.

FIG. 5 illustrates how the system of FIG. 3 functions as a FIFO for the blanking region data. In the first time intervals of the timing diagram, scaling operations similar to those of FIG. 4 are occurring. The blanking input 108 to the first scaling block 100 is pulled to an asserted state, shown in FIG. 5 as a high state, indicating that blanking region data (B1-Bn) is being provided on the video input signal 104. As such, the first filter block 100 buffers the first four data sets in the register set 120, and then provides a blanking signal 168 to the second filter block 160 to inform the DTO of the second filter block 160 that blanking data is being passed. The qualifiers 166 received by the second filter block are configured to indicate valid data as long as blanking data is being passed down the pipeline.

The second filtering block 160 fills its register set and then provides the buffered data 184, blanking signal 188, and valid qualifiers 186 to the third filtering block 180. Assuming that the buffering capabilities of the horizontal scaler are sufficient to buffer all of the blanking data, the third filtering block 180 will provide the blanking data to its output at the output data rate, which is slower than the input data rate of the data stream. As such, the blanking data will be gradually replaced in the registers with additional video image data. Note that if the buffering capabilities of the horizontal scaler are insufficient to fully buffer the blanking data, some additional buffering may be required. However, even if additional buffering is required, it will be smaller than would be required if the registers in the horizontal scaler were not used as a data FIFO. The only additional buffering required for the scaled data is buffering associated with an instantaneous phase differential between the data provided by the scaling operations and the output signal 54.

Figure 6:
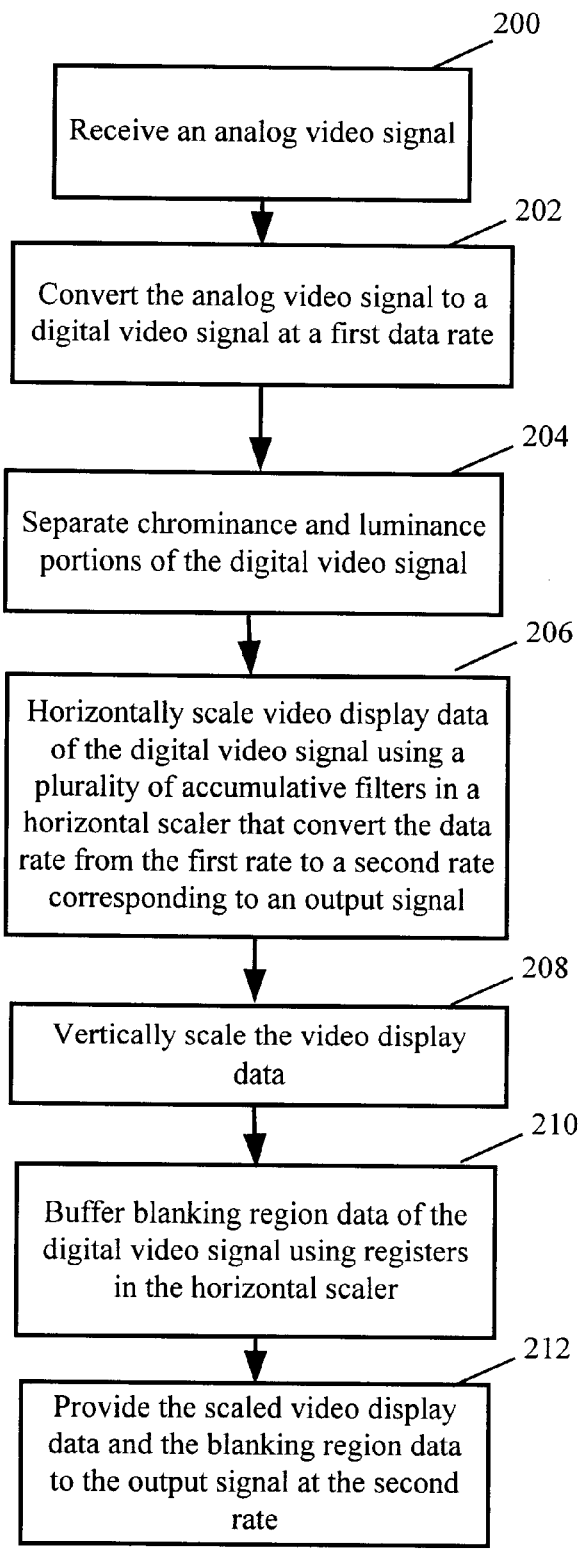
FIG. 6 illustrates a flow diagram of a method for decoding an input video signal in accordance with the present invention.

FIG. 6 illustrates a flow diagram of a method for decoding an input video signal. The method begins at step 200, where an analog video signal is received. At step 202, the analog video signal is converted to a digital video signal at a first data rate. Once again, if the video signal is generated by a digital source, steps 200 and 202 may be omitted. At step 204, the chrominance and luminance portions of the digital video signal are separated to produce YUV data.

At step 206, the video display, or YUV, data are horizontally scaled to produce horizontally scaled video display data. Scaling the video display data is performed by a plurality filtering blocks in a horizontal scaler, where the filtering blocks are preferably structured in the manner illustrated in FIG. 2. Note that the number of registers and mathematical operations performed within the filtering blocks may be altered to suit the particular scaling operation. The plurality of filtering blocks are configured based on the first data rate and a second data rate, where the second data rate corresponds to an output signal. Thus, based on the data rate differential between the input signal and the output signal, the filtering blocks are adjusted such that output data is generated at the second data rate based on input received at the first data rate.

At step 208, the video display data that has been horizontally scaled is vertically scaled. As stated earlier, vertical scaling may occur prior to the horizontal scaling that takes place, or may be eliminated completely. At step 210, blanking region data that is included in the video data signal is buffered using registers in the horizontal scaler. This effective use of the data pipeline, or register sets, of the horizontal scaler allows the buffering capacity required in prior art solutions to be greatly reduced or eliminated. At step 212, the scaled video data and the blanking region data are provided to the output signal at the second rate. Note that the output signal may include invalid data portions that are accompanied by qualifiers indicating that the data should be discarded in generation of the output data stream. Thus, the effective data rate, or rate of valid data, of the data provided to the output signal corresponds to the desired output data rate.

Figure 7:
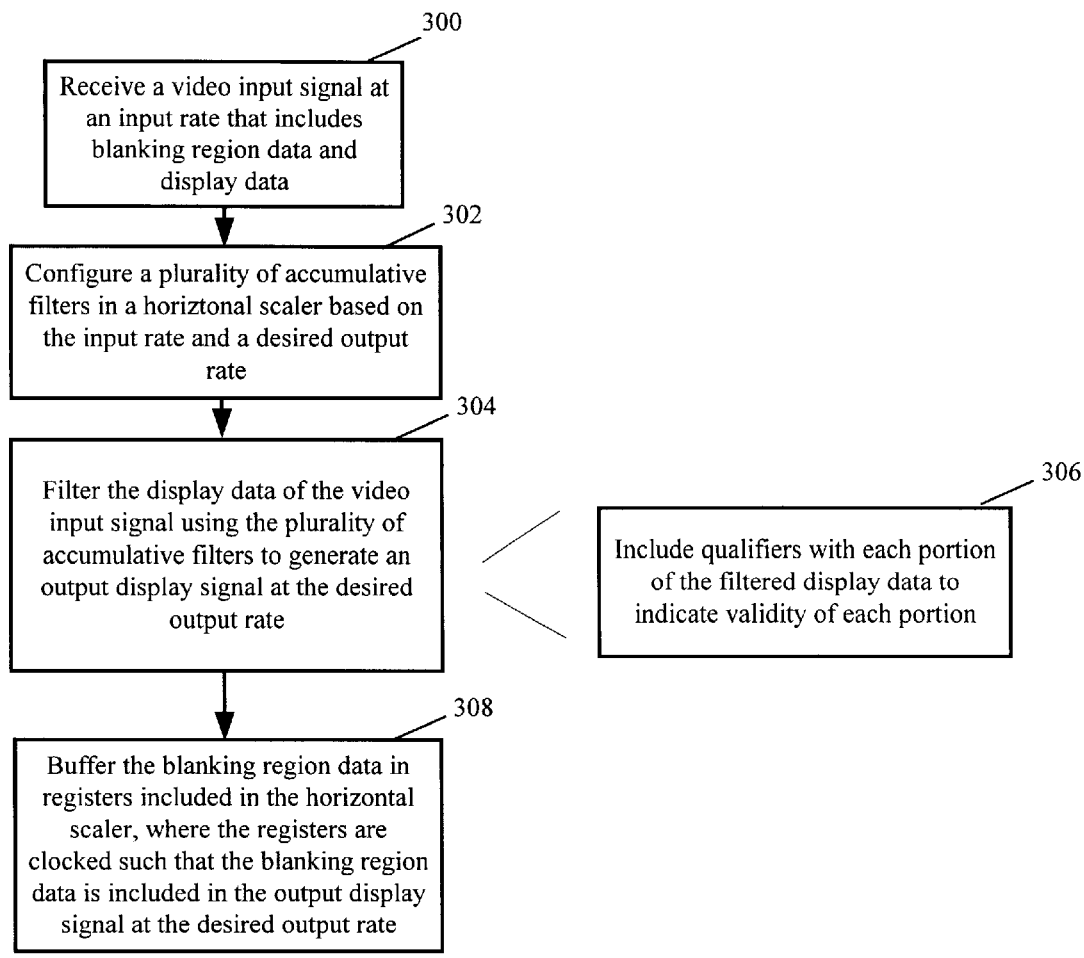
FIG. 7 illustrates a flow diagram of a method for horizontal scaling of an input video signal in accordance with the present invention.

FIG. 7 illustrates a flow diagram of a method for horizontally scaling an input video signal. The method begins at step 300 where a video input signal is received at an input rate. The video input signal includes blanking region data and display data, where display data is used directly for image generation and blanking region data may include non-display information as well as indirect display information such as that used for closed captioning.

At step 302, a plurality of filtering blocks included in the horizontal scaler are configured based on the input data rate and a desired output data rate. Preferably, the ratio of the output data rate and the input data rate is stored within a register such that the configuration of the accumulative filters is based on the ratio stored in the register. The configuration controls the level of downscaling performed within each of the filtering blocks.

At step 304, the display data of the video input signal is filtered using the plurality of the filtering blocks to generate an output display signal at the desired output rate. Preferably, step 304 includes step 306 where qualifiers are passed with each portion of the filtered display data to indicate validity of each portion. Thus, filtering blocks may generate portions of data that are not to be included in the output display signal. As such, the qualifiers associated with these output signals from these filtering blocks will indicate that these data portions are invalid and should not be included in the output display.

At step 308, when the blanking region data is associated with the video input signal is received, it is buffered using registers included in the horizontal scaler. The registers act as a FIFO buffer such that the blanking region data is included in the output display signal at the desired output rate. This utilization of these registers for buffering greatly reduces or eliminates the buffering requirements of prior art systems that performed similar data rate conversion.

It should be understood that the implementation of variations and modifications of the invention and its various aspects will be apparent to those of ordinary skill in the art, and that the invention is not limited to the specific embodiments described. It is therefore contemplated to cover by the present invention any and all modifications, variations, or equivalent that fall within the spirit and scope of the basic underlying principles disclosed and claimed herein.

What is claimed is:

1. A configurable horizontal scaler for a video decoder, comprising:
    a plurality of filter blocks, wherein filter blocks of the plurality of filter blocks are intercoupled to perform horizontal scaling operations, wherein the plurality of filter blocks is operably coupled to receive an input video data stream at an input rate, wherein the plurality of filter blocks is configured based on the input rate and a desired output rate, wherein the plurality of filter blocks scales the input video data stream to produce a scaled data stream at the desired output rate.

2. The configurable horizontal scaler of claim 1, wherein each filter block of the plurality of filter blocks further comprises:
    a register set, wherein the register set includes a plurality of registers, wherein the plurality of registers are intercoupled to form a data path, wherein a first register in the data path of each register set receives an input data signal, wherein the first register in the register set of a first filter block of the plurality of filter blocks in the configurable horizontal scaler receives the input video data stream as the input data signal;
    at least one multiplier operably coupled to the register set, wherein the at least one multiplier combines data stored in the plurality of registers with a plurality of coefficient values to produce a plurality of products; and
    an adder operably coupled to the at least one multiplier, wherein the adder combines the plurality of products to produce a filter block output, wherein the filter block output of a final filter block is the scaled data stream, and wherein the filter block output of other filter blocks is provided as the input signal to a subsequent filter block of the plurality of filter blocks of the configurable horizontal scaler.

3. The configurable horizontal scaler of claim 2, wherein each register set receives a qualifier signal, wherein the qualifier signal indicates whether valid data is present on the input data signal.

4. The configurable horizontal scaler of claim 3, wherein each filter block of the plurality of filter blocks further comprises:
    a discrete time oscillator operably coupled to receive the qualifier signal, wherein the discrete time oscillator generates a qualifier output signal based on the qualifier signal and a corresponding filter block scaling ratio for the filter block, wherein the qualifier output signal of the final filter block serves as a qualifier for the scaled data stream, and wherein the qualifier output signal of other filter blocks is provided as the qualifier signal to the subsequent filter block in the configurable horizontal scaler.

5. The configurable scaler of claim 4, wherein the discrete time oscillator of each filter block of the plurality of filter blocks is operably coupled to receive a blanking input, wherein, when asserted, the blanking input causes the discrete time oscillator to:
    generate the qualifier output signal such that blanking region data is treated as valid data; and
    generate a corresponding blanking output that is provided to the subsequent filter block in the configurable horizontal scaler.

6. The configurable horizontal scaler of claim 1 further includes a scaling ratio register that stores a scaler scaling ratio that corresponds to the input rate and the desired output rate, wherein filtering operations performed by the plurality of filter blocks are configured based on the scaler scaling ratio.

7. A method for horizontal scaling of an input video signal, comprising:
    receiving a video input signal at an input rate, wherein the video input signal includes blanking region data and display data;
    configuring a plurality of intercoupled filter blocks in a horizontal scaler based on the input rate and a desired output rate;
    filtering the display data of the video input signal using the plurality of intercoupled filter blocks, wherein filtering the display data scales the display data to generate filtered display data that is included in an output display signal at the desired output rate; and
    buffering the blanking region data in registers included in the horizontal scaler, wherein the blanking region data is included in the output display signal at the desired output rate.

8. The method of claim 7 further comprises passing a qualifier with each corresponding portion of the filtered display data, wherein each qualifier indicates validity of the corresponding portion of the filtered display data.

9. The method of claim 8, wherein the input rate and the desired output rate are stored in a scaling ratio register.

10. A method for decoding an input video signal, comprising:

receiving an analog video signal;

converting the analog signal to a digital video signal at a first data rate, wherein the digital video signal includes video display data and blanking region data;

horizontally scaling the video display data to produce horizontally scaled video display data, wherein horizontal scaling of the video display data is performed by a plurality of intercoupled configurable filtering blocks in a horizontal scalers wherein the plurality of intercoupled configurable filtering blocks is configured based on the first data rate and a second data rate corresponding to an output signal;

buffering the blanking region data of the digital video signal, wherein the blanking region data are buffered in registers included in the horizontal scaler, wherein the registers are used as a data path in the plurality of intercoupled configurable filtering blocks; and providing the horizontally scaled video display data and the blanking region data to the output signal, wherein the output signal is clocked at the second data rate.

11. The method of claim 10 further comprises separating chrominance and luminance portions of the video display data prior to scaling.

12. The method of claim 10 further comprises vertically scaling the video display data.

13. A video decoder, comprising:

a separation block, wherein the separation block receives a digital video signal and produces separated video data, wherein the separated video data is generated at a first rate;

a horizontal scaler operably coupled to the separation block, wherein the horizontal scaler receives the separated video data at the first rate and scales the separated video data based a scaling ratio to produce scaled data at a second rate; and a digital video stream output block, wherein the digital video stream output block receives the scaled data and generates a digital video stream output signal at the second rate.

14. The video decoder of claim 13, wherein the horizontal scaler includes a plurality of intercoupled configurable filter blocks wherein each filter block of the plurality of intercoupled configurable filter blocks performs a portion of the scaling.

15. The video decoder of claim 14, wherein the digital video signal includes blanking region data, wherein each filter block of the plurality of intercoupled configurable filter blocks in the horizontal scaler includes at least one register, wherein registers in the horizontal scaler form a data path that is used as a buffer for the blanking region data.

16. The video decoder of claim 15, wherein the data path operates as a first in first out buffer for the blanking region data.

17. The video decoder of claim 14 further comprises a vertical scaler operably coupled to the horizontal scaler and the digital video stream output block, wherein the vertical scaler receives output data from a last filter block of the plurality of intercoupled configurable filter blocks in the horizontal scaler, wherein the vertical scaler vertically scales the output data provided to the digital video stream output block.

18. The video decoder of claim 13, wherein the scaling ratio is stored in a register.

19. The video decoder of claim 13 further comprises an analog to digital converter, wherein the analog to digital converter receives an analog video signal and produces the digital video signal.

20. The video decoder of claim 13, wherein the separation block performs chrominance and luminance separation to produce the separated video data.

21. The video decoder of claim 20, wherein the separation block includes a comb filter.

* * * * *